(12) United States Patent
Wallaja

(10) Patent No.: US 9,892,401 B2
(45) Date of Patent: Feb. 13, 2018

(54) TRANSACTION COMPLETION USING IDENTITY AGGREGATOR

(71) Applicant: Kachyng, Inc., San Francisco, CA (US)

(72) Inventor: Resh Wallaja, San Francisco, CA (US)

(73) Assignee: Kachyng, Inc., San Francisco, CA (US)

( * ) Notice: Subject to any disclaimer, the term of this patent is extended or adjusted under 35 U.S.C. 154(b) by 514 days.

(21) Appl. No.: 14/516,525

(22) Filed: Oct. 16, 2014

(65) Prior Publication Data

US 2015/0112864 A1    Apr. 23, 2015

Related U.S. Application Data

(60) Provisional application No. 61/892,280, filed on Oct. 17, 2013.

(51) Int. Cl.
*G06Q 40/00* (2012.01)
*G06Q 20/32* (2012.01)
*G06Q 20/02* (2012.01)
*G06Q 20/12* (2012.01)

(52) U.S. Cl.
CPC ........... *G06Q 20/322* (2013.01); *G06Q 20/02* (2013.01); *G06Q 20/12* (2013.01)

(58) Field of Classification Search
USPC ........................................................... 705/44
See application file for complete search history.

(56) References Cited

U.S. PATENT DOCUMENTS

| 2012/0041879 A1* | 2/2012 | Kim | G06Q 20/40 705/44 |
| 2013/0346302 A1* | 12/2013 | Purves | G06Q 20/102 705/40 |

* cited by examiner

*Primary Examiner* — Jason Borlinghaus
(74) *Attorney, Agent, or Firm* — Fenwick & West LLP

(57) ABSTRACT

A transaction processing server acts as an identity aggregator and enables transactions between a user computing device and plurality of merchant servers. The transaction processing server receives a request from the user computing device to conduct the financial transaction with a merchant server. The transaction processing server determines a plurality of user identifiers identifying a user account associated with the user computing device at each of a plurality of online systems, where a first identifier is a transaction processing server identifier identifying a user account at the transaction processing server and a second identifier is a merchant identifier identifying a user account at the merchant server. Financial information is retrieved using the plurality of user identifiers. The transaction processing server transmits the merchant identifier and the financial information of the user to the merchant server, which conducts the transaction with the user computing device using the financial information.

16 Claims, 14 Drawing Sheets

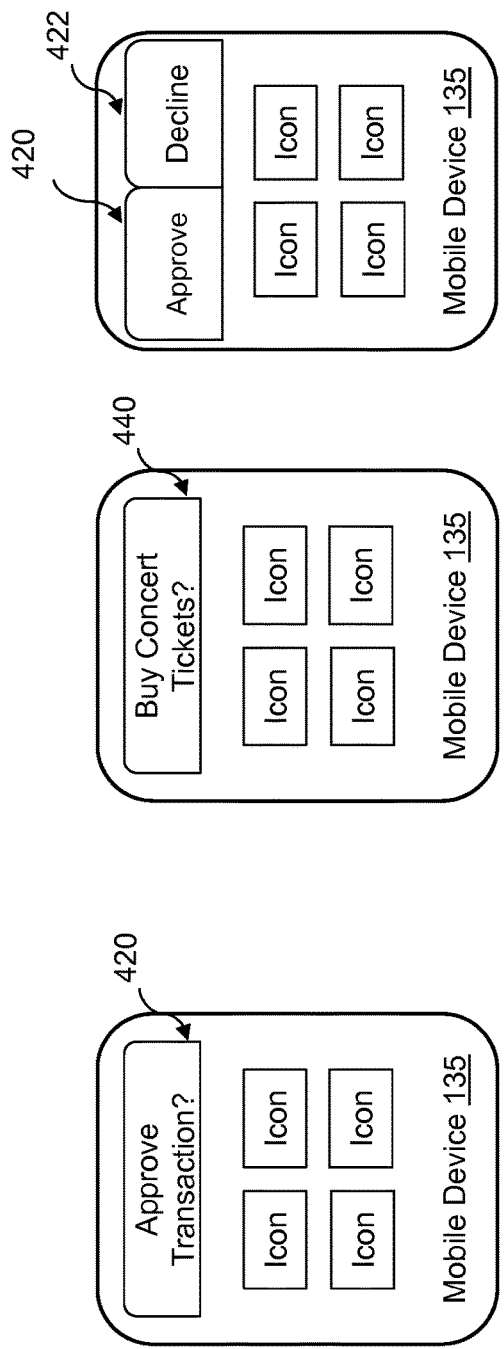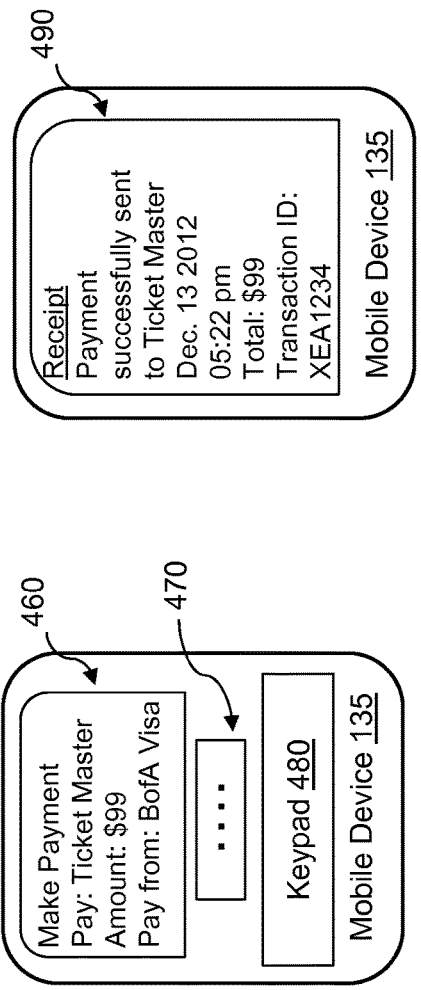

TRANSACTION COMPLETION USING IDENTITY AGGREGATOR

CROSS-REFERENCE TO RELATED APPLICATION

This application claims the benefit of U.S. Provisional Patent Application No. 61/892,280, filed Oct. 17, 2013, which is incorporated herein by reference in its entirety.

BACKGROUND

1. Field of the Disclosure

This disclosure relates generally to e-commerce, and in particular to systems and methods for using an identity aggregator to facilitate online transactions.

2. Description of the Related Art

Online transactions for selling and buying products are becoming commonplace. To facilitate online transactions, merchants provide commerce websites that include products available for purchase and integrate with payment gateways to enable users to purchase the products through the commerce websites. When shopping online via a commerce website, users often create accounts with the website by selecting a user name, entering and verifying an email of the user, entering financial information such as a credit card number or a bank account number, and providing a billing address. A user may log into a user account when the user desires to purchase a product, or the user may enter financial information, billing address, and the like each time the user places an order.

While creating an account with an online merchant is more convenient for customers who frequently shop with a particular merchant than re-entering financial information each time the customer desires to make a purchase, many consumers purchase products or services from multiple different merchants. If a consumer creates accounts with each of several merchants, the consumer must remember several different username and password combinations, which can be cumbersome, inconvenient, and prone to security risks, as passwords can be stolen or harvested. Therefore, a need exists for a payment solution that overcomes the disadvantages described above with conventional payment methods.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIGS. 4A-4I are example screenshots illustrating a process for conducting a transaction, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method, and computer readable storage medium that includes aggregating user identities at a transaction processing server to enable transactions between a user device and a merchant server. In one embodiment, the transaction processing server acts as an identity aggregator and provides user identities to the merchant server so that the user does not need to recall and input log in information that is particular to the user's account with the particular merchant server. Further, in one embodiment, the transaction processor authenticates the transaction using a mobile device associated with the user account and likely used by the user, thereby improving security of the transaction. In one embodiment, the method includes receiving at the transaction processing server, a request from the user computing device to conduct the financial transaction with the merchant server. A plurality of user identifiers identifying a user account associated with the user at each of a plurality of online systems are determined based on sessions with the online systems active on the user computing device. A first user identifier of the plurality of user identifiers is a transaction processing server identifier identifying a user account at the transaction processing server and a second user identifier of the plurality of user identifiers is a merchant identifier identifying a user account at the merchant server. Financial information associated with the user account of the user is retrieved using the plurality of user identifiers. The transaction processing server transmits the merchant identifier and the financial information of the user to the merchant server, which conducts the transaction with the user computing device using the financial information.

Figure 1A:
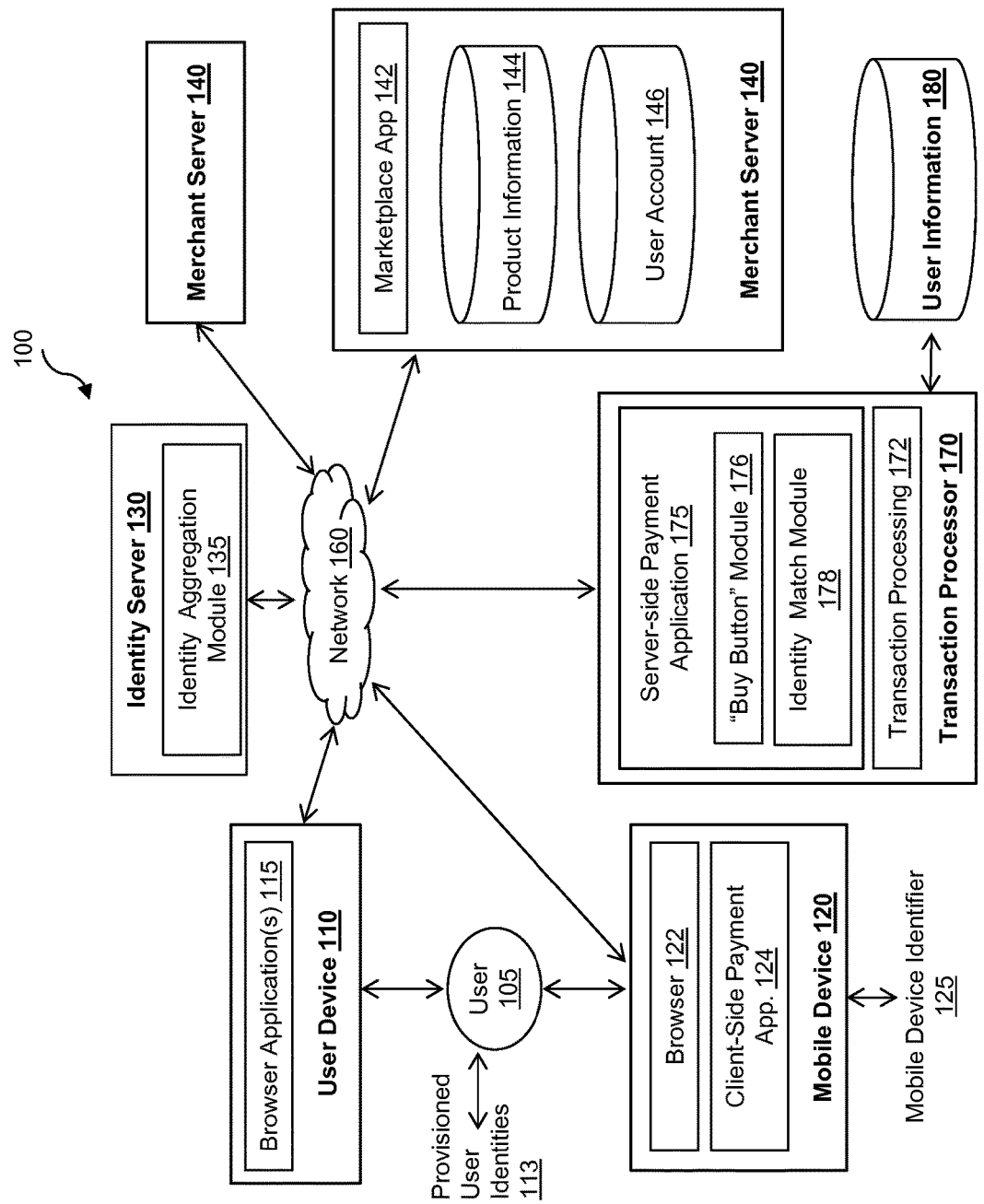
FIG. 1A illustrates a block diagram of a system for conducting transactions, according to one embodiment.

FIG. 1A illustrates a system environment 100 for conducting online transactions, according to one embodiment. A transaction as described herein refers to any action between a user device and a merchant system, including payments, transfer of information, display of information, new user registration, and the like. Transactions may include the transfer of money from a financial account of a user to a merchant system (e.g., to pay for a product or service offered by the merchant system), or the merchant system may offer products or services free of charge. In one embodiment, as shown in FIG. 1A, the system environment 100 includes one or more user (or client) devices 110, a mobile device 120, an identity server 130, one or more merchant servers 140, and a transaction processing server 170 in communication over a network 160. A user 105 uses the user device 110 to initiate a transaction at a merchant server 140.

User device 110, merchant server 140, and transaction processing server 170 may each include one or more processors, memories, and other appropriate components for executing instructions such as program code and/or data stored on one or more computer readable media to implement the various applications, data, and steps described herein. For example, such instructions may be stored in one or more computer readable media such as memories or data storage devices internal and/or external to various components of system 100, and/or accessible over network 160.

Network 160 may comprise any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

The user device 110 may be implemented using any appropriate hardware and software configured for wired and/or wireless communication over the network 160. For example, the user device 110 may be implemented as a personal computer (PC), a tablet, personal digital assistant (PDA), laptop computer, a smart television, and/or other types of computing devices capable of transmitting and/or receiving data over network 160. In some embodiments, the user device 110 may be mobile device such as a tablet or mobile phone, while in other embodiments, as illustrated in FIG. 1A, the user 105 uses a separate mobile device 120. The user 105 may use one or more user devices 110, one or more mobile devices 120, or both a user device 110 and a mobile device 120.

The user device 110 executes a browser application 115 that enables the user 105 to browse information available over the network 160. In one embodiment, the browser application 115 is implemented as a web browser configured to view information available over the Internet, including accessing content of a social networking site and a web email client as well as content provided by a merchant server 140.

The mobile device 120 (e.g., a cellular phone or a tablet) communicates with other mobile devices, the user device 110, the merchant server 140, and/or the transaction server 170 over a mobile communication network (not shown) or the network 160. The mobile device 120 has a mobile device identifier 125, such as a mobile phone number, an integrated digital enhanced network (IDEN) number, or an international mobile station equipment identity (IMEI) number. In one embodiment, the mobile device 120 executes one or more browser applications 122 providing an interface for the user 105 to browse information made available over the network 160. For example, the browser application 122 may be implemented as a web browser configured to view information available over the Internet, including accessing a social networking site or a web email client as well as accessing content provided by a merchant server 140.

The mobile device 120 may additionally or alternatively execute a client-side payment application 124. In one embodiment, the client-side payment application is provided by the transaction processing server 170 (e.g., downloaded to the mobile device 120) and may be used, for example, to provide client-side processing for performing desired tasks in response to operations selected by the user 105. In one embodiment, client-side payment application 124 has unique identifier and is uniquely tied to a mobile device identifier 125 associated with the mobile device 120. In one embodiment, the client application 124 displays a user interface in connection with a financial transaction initiated by user 105 using the browser application 115 executing on user device 110.

Associated with the user 105 and/or the user device 110 are one or more user identifiers 113 (e.g., username and password pairs) associated with user accounts at one or more online systems accessed via the user device 110 or the user device 135. For example, the user 105 may currently be using a first username and password to access a FACEBOOK account, a second username and password to access a GMAIL account, a third username and password to access an online retailer, and so on. One or more of the identifiers 113 may be stored locally on the user device 110, for example in cookies or a cache associated with the browser application 115.

The identity server 130 manages the user identifiers 113. The identity server 130 may be maintained by a third party provider, or the identity server 130 may be incorporated into the transaction processing server 170. The identity server 130 may authenticate the user 105 across multiple sites and identities using the user identifiers 113. In one embodiment, the identity server 130 executes an identity aggregation module 135. The identity aggregation module 135 comprises software configured to aggregate a user's user identifiers 113 from the user device 110. The identity aggregation module 135 may execute in the browser 115, for example as a browser pop-up or overlay, a browser plug-in, or a browser toolbar, to retrieve the identifiers 113 from the online sessions active in the browser 115. The identity aggregation module 135 communicates with the transaction processing server 170 and merchant server 140 to pass identity information in order to facilitate a registration of the user 105 or to conduct a payment transaction.

The merchant server 140 is maintained by a merchant or seller offering various products and/or services via online an online marketplace available over network 160. The merchant server 140 may be used for point of sale (POS) or online purchases and transactions. Generally, the merchant server 140 may be maintained by any person or entity that provides an Internet-based service for which the person or entity receives money, including charities, traditional retailers, pop-up retailers, and restaurants. However, the merchant server 140 may offer products or services free of charge. The merchant server 140 may additionally or alternatively be an entity listing an advertisement for a product or service. In one embodiment, the merchant server 140 executes a marketplace application 142 configured to serve information over the network 160 to the browser 115 of the user device 110. For example, the merchant server 140 may cause a webpage to be displayed via the browser application 115 on a display of the user device 110. The webpage may contain content, such as information about a product for sale. In some embodiments, the webpage depicts a popup store.

In one embodiment, the merchant server 140 maintains a product information database 144 and a user account database 146. The product information database 144 contains information about goods, merchandise, content, or services (collectively, "products") that are available for purchase by users, including identifiers of the products, availability of the products, and price of the products. The user account database 146 stores information about users of the merchant server 140, such as users who have established accounts with the merchant server 140. The user information stored by the user account database 146 may include an identifier of the user at the merchant server 140 that can be used by the merchant server 140 to access an account associated with the user. In one embodiment, the user account database 146 does not store financial information of the user.

The transaction processing server 170 uses aggregated user identities to authenticate a user to the merchant server 140 and facilitate transactions between the merchant server 140 and the user device 110 (or the user device 135). The transaction processing server 170 may be maintained by an online payment service provider, which provides payment to the operator of the merchant server 140 for a transaction initiated by the user 105. In one embodiment, the transaction processing server 170 executes a payment application 175 and a transaction processing module 172, and maintains a user information database 180. Other embodiments of the transaction processing server 170 may execute additional or different modules, and the functionality may be distributed differently among the modules. For example, another embodiment of the transaction processing server 170 may include a product shipping module that performs at least one product shipping-related functionality, such as causing a product to be shipped to the user 105.

The user information database 180 stores a plurality of user accounts, each of which includes user account information associated with an individual user. For example, account information may include private financial information of users of devices such as account numbers, passwords, device identifiers, user names, phone numbers, credit card information, bank information, or other financial information which may be used to facilitate online transactions by user 105. A user account in the user information database 180 can be accessed using a user identifier of a user associated with the user account. In one embodiment, the information stored in a user account may be provided by the user in creating an account with and registering with server-side payment application 175, for example when installing client-side payment application 124 on user mobile device 120.

The payment application 175 executed by the transaction processing server 170 communicates with the user device 110 or the mobile device 120 and the merchant server 140 over the network 160 to facilitate the purchase of goods or services, communicate and display information, and send payments by the user 105 to the operator of the merchant server 140. The payment application 175 may also communicate with the client-side payment application 124 executing on the mobile device 120 to authorize the transaction. In one embodiment, the payment application 175 includes a buy button module 176 and an identity match module 178, and is in communication with the user information database 180. In one embodiment, the buy button module 176 provides a "buy button," a user interface element invoking a checkout or payment function, for insertion into content in a web page displayed on the user device 110 or the mobile device 120. For example, the buy button may be embedded in an advertisement, displayed in a social media feed, or included in email content or application data served by the merchant server 140 and displayed on the user device 110. The buy button module 176 may also provide new user registration and cause registration information to be stored in the user database 180.

When a user selects the buy button displayed on the user device 110, the buy button module 176 invokes the identity aggregation module 135 of the identity server 130, which aggregates user's provisioned identities 113 from the user device 110. The identity aggregation module 135 communicates the identities to the transaction processing server 170, where the identity match module 178 causes a user record to be created in the user information database 180 or updates an existing user record in the database 180.

The transaction processing module 172 processes payments to the merchant server 140 on behalf of the user 105. For example, the transaction processing module 172 sends funding source information, such as a credit card or bank account information, to the merchant server 140 to complete the transaction.

As shown in FIG. 1A, the transaction processing server 170 may facilitate transactions between the user device 110 and each of a plurality of merchant servers 140. The transaction processing server 170 may act as an identity aggregator for identities that can be used across several merchant servers 140, obviating the need for the user 105 to recall login information to access accounts created with each of the merchant servers 140. Instead, in some embodiments, the user 105 may simply need to recall a single login information for a single account associated with the transaction processing server 170. In some embodiments, the login information for the account associated with the transaction processing server 170 may be an existing social identity, such as a social network identity or email identity for the user. Thus, for example, the user 105 may log into the user account with the transaction processing server 170 using the user's FACEBOOK identity. Furthermore, as the transaction processing server 170 sends funding source information to a merchant server 140 for conducting a transaction, the merchant servers 140 need not store users' financial information. Storing financial information in a single system (the transaction processing server 170) is more secure for users, and reduces cost for the merchant servers 140 to establish and maintain secure databases for storing user financial information.

Figure 1B:
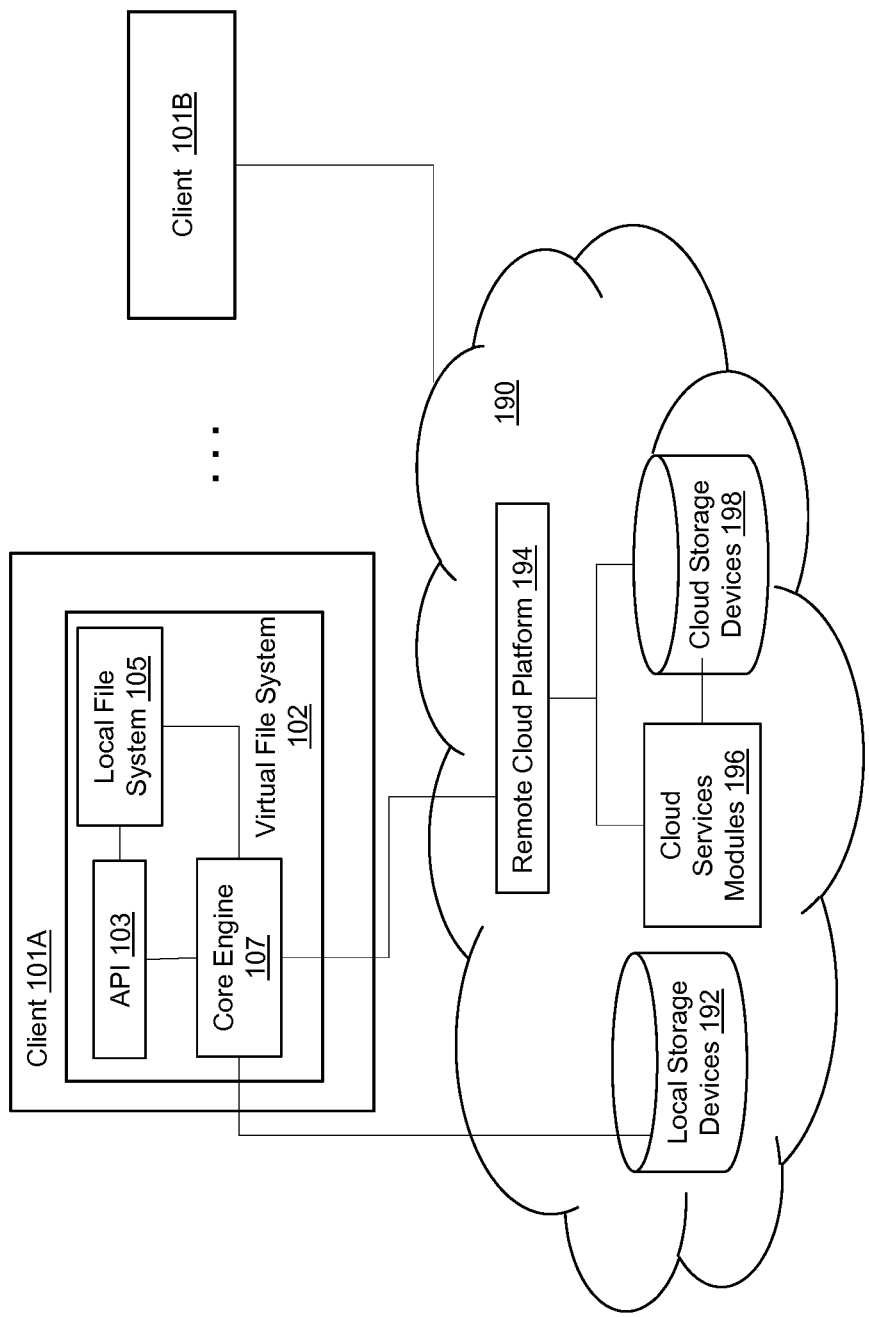
FIG. 1B is a block diagram illustrating a plurality of computing devices that are communicatively coupled to a distributed storage system, according to one embodiment.

In some embodiments, the merchant server 140 and the transaction processing server 170 use cloud computing. FIG. 1B is a block diagram illustrating a plurality of computing devices, each including a virtual file system, that are communicatively connected to a distributed storage system according to some embodiments. Clients 101A and 101B (e.g., the merchant server 140 and the transaction processing server 170) are communicatively coupled to a storage cloud 121, each client including a virtual file system 102. In some embodiments, the virtual file system 102 includes an application programming interface (API) 103, a local file system 105, and a core engine 107. API 103 is a software application for accessing the storage cloud 190 through the core engine 107. In some embodiments, API 103 is an application dedicated for this purpose. In some embodiments, API 103 is an application that can perform multiple functions including accessing the storage cloud 190. In some embodiments, the local file system 105 is the file system associated with the operating system (e.g., UNIX, WINDOWS, or LINUX, etc.) running on client 101. For example, a user (e.g., a software application) can use the local file system 105 to access files not managed by the virtual file system 102. Core engine 107 refers to a set of application modules that are responsible for managing different aspects of the virtual file system 102, such as retrieving files from a remote storage device, etc.

In some embodiments, storage cloud 190 is a distributed, heterogeneous storage system including multiple types of storage devices such as local storage devices 192 (e.g., thumb drive, hard drive, network attached storage (NAS), etc.) and remote (and often distributed) cloud storage devices. In other words, the term "cloud" as used herein may refer to storage devices that are physically local to or remote from the virtual file system. In some embodiments, the remote cloud storage device is a cloud storage service provided by a third-party (e.g., AMAZON S3). In some embodiments, the cloud storage service includes a remote cloud platform 194, a set of cloud service modules 196, and a set of cloud storage devices 198. The remote cloud platform 194 is typically a front end accessible through a web server. The cloud service modules 196 are responsible for performing operations (e.g., queuing, logging, billing, etc.) in support of the storage service. The cloud storage devices 127 are associated with a hardware architecture (e.g., storage area network) that supports massive data storage/access through network connections such as Internet.

In some embodiments, a user of the virtual file system 102, which may be a software application, submits a request for a file to the API 103. In response to the request, the API 103 checks if the requested file is available at the local file system 105. If so, it returns the requested file to the requesting user. If not, the API 103 may forward the file request to the core engine 107. The core engine 107 determines how to retrieve information associated with the file from a storage device within the storage cloud 190. After receiving the information, the core engine 107 then rebuilds the requested file in the local file system 105 and makes it available for the user to access. Upon detection of the user's updates to the file, the core engine 107 then generates a new revision of the file and synchronizes the revised file including its metadata and data with one or more storage devices associated with the storage cloud 190 to make sure that all the user updates are appropriately saved and protected against potential file loss and/or unauthorized access.

Figure 2A:
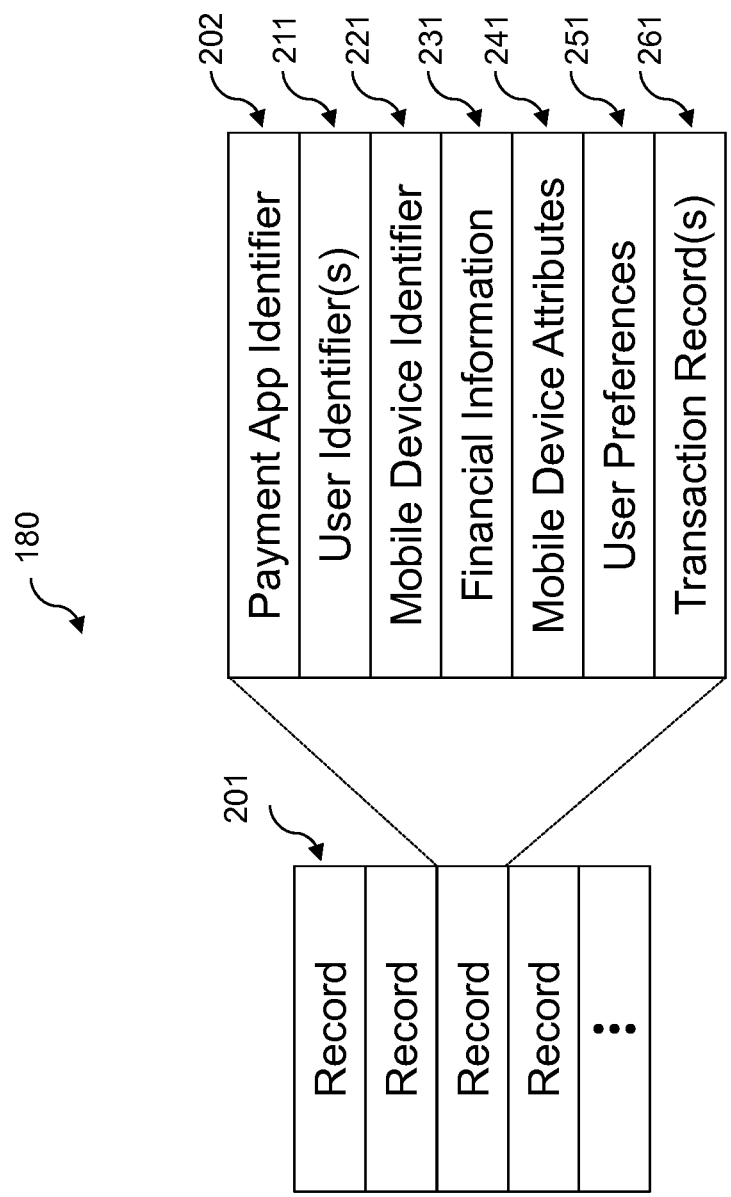
FIG. 2A is a block diagram of a database structure for storing user data, according to one embodiment.

FIG. 2A is a block diagram of a structure of the user database 180 maintained by the transaction processing server 170, according to one embodiment. The user database 180 contains a set of user account records. A respective user account record 201 may include such information as: (i) an identifier 202 that uniquely identifies the client-side payment application 124 installed on the user's mobile device 120, (ii) one or more user identifiers 211 associated with the user (e.g., user's login user name and password associated with transaction processing server 170, user's login user name and password associated with a social networking site, user's email login user name and password, and user's account user name and password associated with merchant servers 140), (iii) a mobile device identifier 221 associated with the user, such as a mobile phone number or an IDEN number, (iv) private financial information 231 of the user, such as credit card information, bank information, or other financial information that may be used to facilitate online transactions by the user, (v) attributes and capabilities 241 of the mobile device associated with the device number 221, (vi) user preferences 251 (such as shipping address), and (vii) transaction records 261 (such as, transaction amounts, dates, etc.) associated with the user record 201.

Figure 2B:
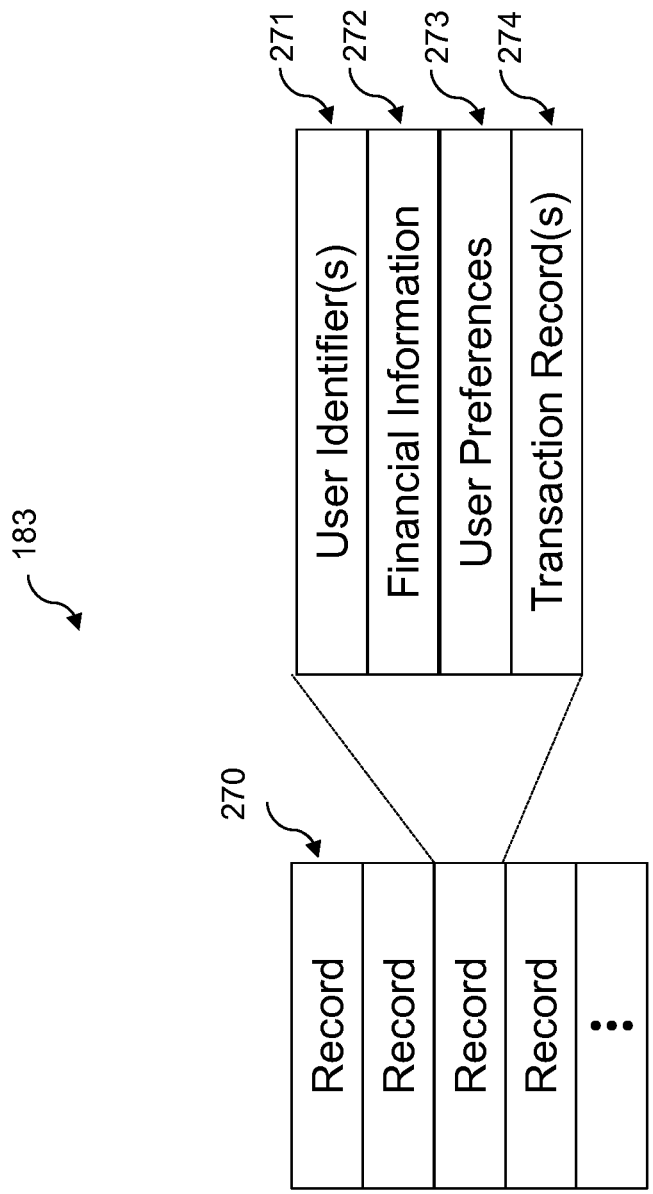
FIG. 2B is a block diagram of a database structure for storing user account data, according to one embodiment.

FIG. 2B is a block diagram of a structure of the user account database 146 maintained by a merchant server 140, according to one embodiment. The user account database 146 contains a set of user account records for a merchant server 140. A respective user account record 270 may include such information as: (i) one or more user identifiers 271 associated with the user (e.g., user's login user name and password associated with merchant server 140) and user contact information, such as name, shipping address, and telephone number, (ii) private financial information 272 of the user, such as credit card information, bank information, or other financial information that may be used to facilitate online transactions by user, (iii) user preferences 273 (such as preferred shipping address), and (iv) transaction records 274 (such as transaction amounts, products purchased, and dates of the transactions) conducted by the user with merchant server 140.

Conducting Financial Transactions

FIGS. 3A-3D illustrate various embodiments of a process for conducting transactions between a user and a merchant server 140 using a transaction processing server 170 acting as an identity aggregator. The processes shown in FIGS. 3A-3D are described with respect to example user interfaces shown in FIGS. 4A-I. While FIGS. 3A-3D discuss various transmissions between merchant server 140 and transaction processing server 170, it is noted that cloud computing as discussed in FIG. 1B may instead be used.

Figure 3A:
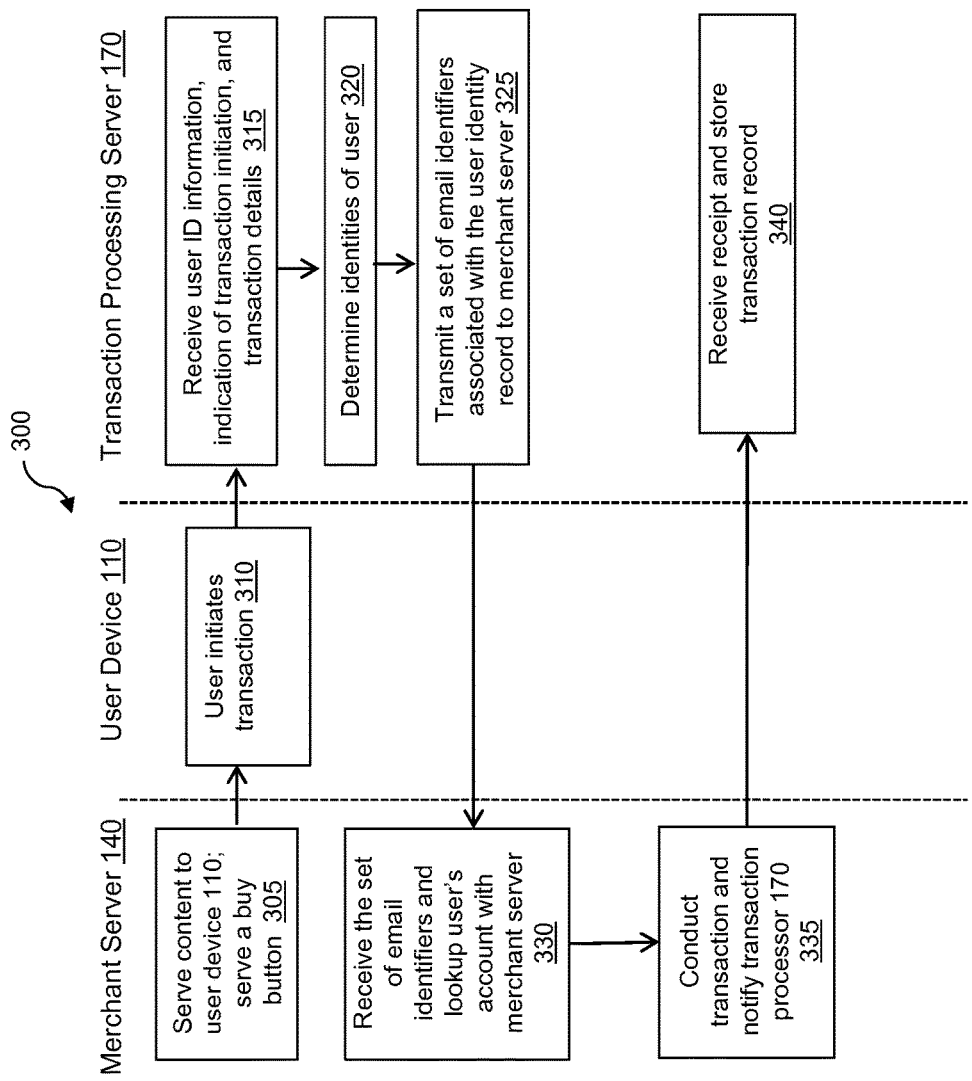
FIGS. 3A-3C are flowcharts illustrating embodiments of processes for using an identity aggregator.
Figure 4B:
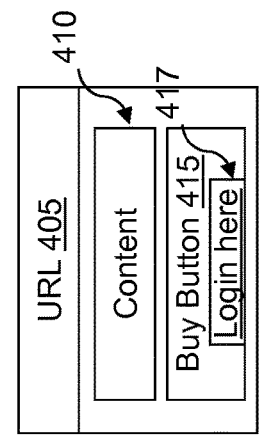
Figure 4D:
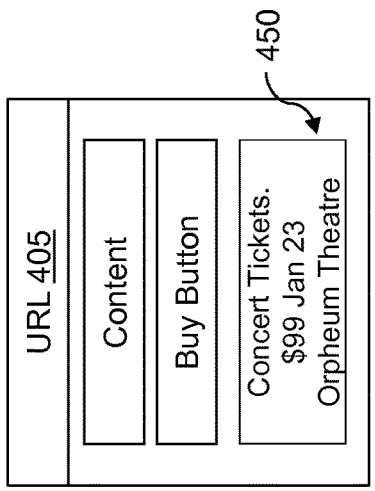
Figure 4A:
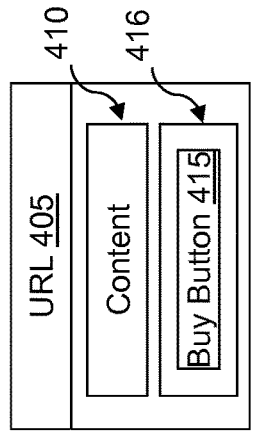

FIG. 3A illustrates a process 300 for using an identity aggregator to conduct a transaction, according to one embodiment. The merchant server 140 serves 305 content to user device 110. The user 105 may interact with marketplace application 142 through browser application 115 over network 160 in order to view one or more items served by merchant server 140 on the user device 110, for example as being served in the form of a pop-up online store, content being advertised, or content displayed in a social feed. The merchant server 140 may further provide a "buy now" button in the content that invites the user to initiate a transaction. FIG. 4A illustrates example content 410 served to the user device 110. In the example of FIG. 4A, the content 410 is served as part of a web page having a URL 405. A buy button 415 is also displayed on the web page, and may be displayed near the content 110 or embedded in the content 410. For example, as shown in FIG. 4B, the buy button 415 is embedded in content 416, which in one example is an advertisement.

If user 105 wishes to purchase an item for sale or otherwise initiate a transaction, the user interacts with the device 110, which initiates 310 the transaction. For example, the user selects the buy button 415 displayed on the user device 110. In one embodiment, the user is not required to create or log into an account associated with the merchant server 140 for the purpose of initiating the transaction.

In response to the user selection of the buy button 415, the user device 110 sends 315 information to the transaction processing server 170. The information sent 315 to the transaction processing server 170 may include a notification of the initiation of the transaction, an identifier of the user, and transaction details such as a transaction amount, identifiers of the products or services being purchased, availability of the products or services being purchased, and an identifier of the merchant server 140 providing the product or services.

The transaction processing server 170 determines 320 a plurality of user identifiers identifying user accounts at respective online systems, including social network identities, email identities, or identities of the user with the merchant server 140 with which the user desires to conduct the transaction. As described earlier, the user may not have entered a username and password into the merchant server's site before selecting the buy button 415. As such, the merchant server 140 may not be able to identify the user, and an identity of the user at the merchant site 140 is not transmitted to the transaction processing server 170 when the buy button 415 is selected. To determine 320 the user identifiers, one embodiment of the transaction processing server 170 generates an identity framework for the user by retrieving identifiers of the user from one or more other websites for which a session is active on browser 115 and for which the user has provided user identifiers. For example, as discussed above, the user may have logged into an account associated with a social networking site and/or an email site on the user device 110. The user may leave such sessions running in the background while the user conducts other business online, such as running the sessions in another tab in the browser 115 or leaving cookies storing the user identity in the browser 115. In one embodiment, the transaction processing server 170 receives an aggregated list of the user identities from the identity aggregation module 135. The transaction processing server 170 may store the aggregated identities in a record for the user in the user database 180, and retrieve the user's record when the user selects the buy button 415.

The transaction processing server 170 transmits 325 the determined identities to the merchant server 140. The merchant server 140 receives 330 the user identities and uses the identities to determine a user account associated with at least one of them. For example, the merchant server 140 receives a set of email addresses used by the user (e.g., user_name@gmail.com, user_name@personal_email.com, user_name@twitter.com, and user_name@work_email.com), and determines that there is an account for the user_name@work_email.com in user account database 146. The merchant server 140 retrieves the user account information from user account database 146, including stored payment information, shipping address, and the like, and uses this information to conduct 335 the transaction. For example, the merchant server 140 debits a financial account of the user and processes shipment of the purchased product to the user.

Figure 4C:
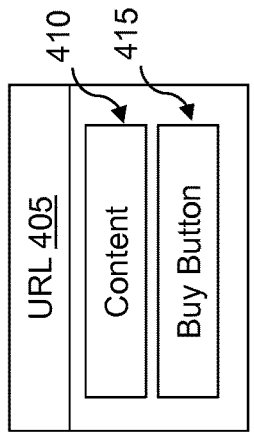

The transaction processing server 170 receives 340 a transaction confirmation from the merchant server 140, and updates the user record using the transaction confirmation. The transaction processing server 170 may further send a receipt to one or more stored email addresses for the user. FIG. 4C illustrate an example of a transaction confirmation 490 sent by the transaction processing server 170 to the user device 110. The transaction confirmation 490 may contain such details as transaction amount, transaction date and time, a transaction record number, and payment source. Although not illustrated in FIG. 4C, the user may be provided with options with respect to transaction confirmation 490, such as to save, print, or email the receipt.

Figure 3B:
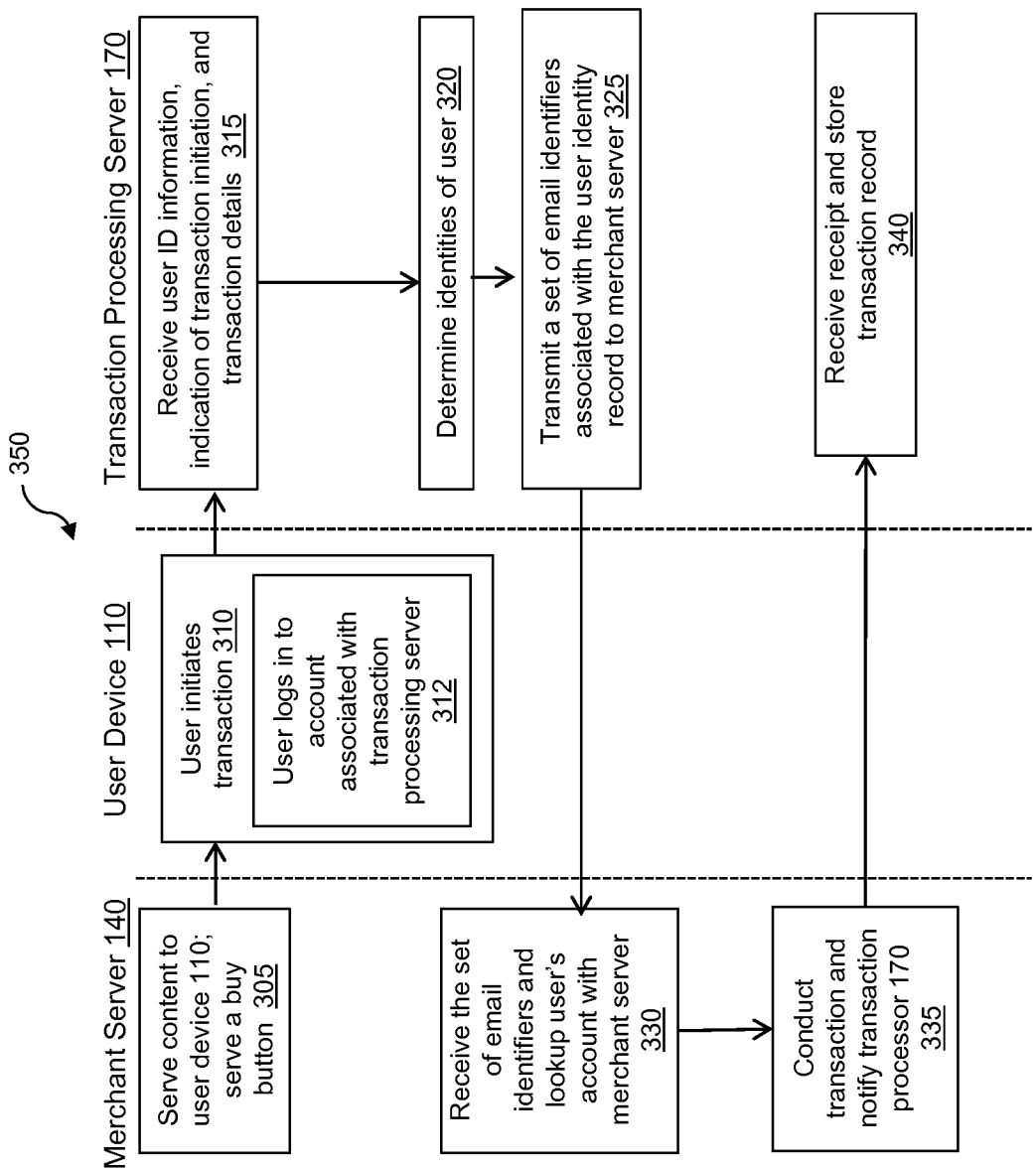

FIG. 3B illustrates a process 350 for using an identity aggregator to conduct a transaction, according to another embodiment. Process 350 is similar to process 300, except that at 312, the user device 110 receives user login information associated with the user's account associated with transaction processing server 170. For example, the user enters a login id and password associated with transaction processing server 170. FIG. 4D illustrates an example user interface icon 417 requesting user to login into an account associated with transaction processing server 170. The user may interact with the icon 417 to log in to the user's account with the transaction processing server 170 prior to selecting the buy button 415, or the user may log in after selecting the buy button 415 but before the transaction processing server 170 determines 320 the identities of the user. The transaction processing server 170 then uses the login information of the user to access the account of the user with the transaction processing server 170, and determines 320 the identities of the user from the user's account. In one embodiment, the user needs only remember a single log in associated with the transaction processing server 170, instead of individual logins for multiple different merchant servers 140.

Figure 3C:
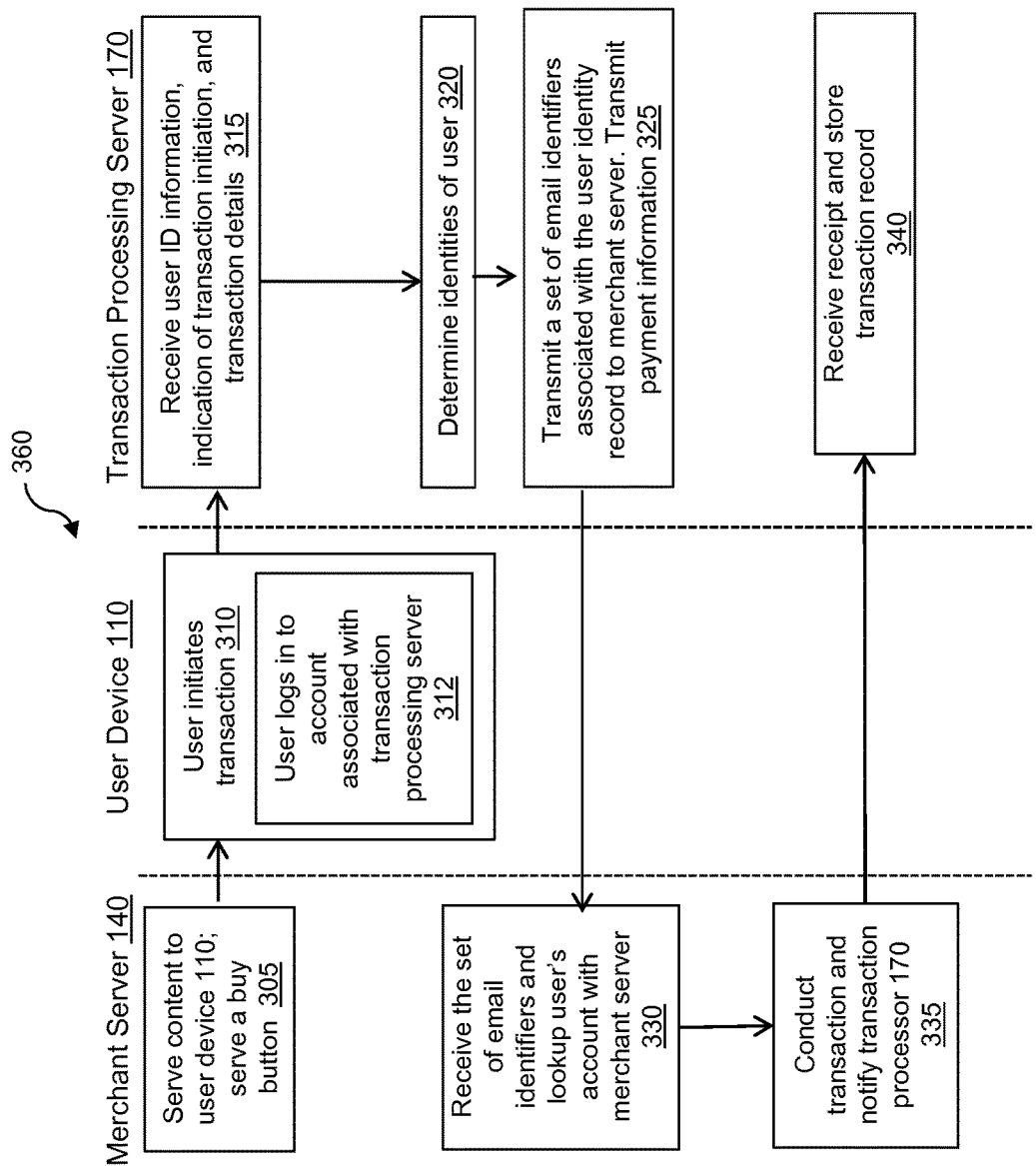

FIG. 3C illustrates a process 360 for using an identity aggregator to conduct a transaction, according to another embodiment. Process 360 is similar to processes 300 and 350, except that at step 425, the transaction processing server 170 uses stored payment information (as stored in the user's account with the transaction processing server 170) to make a pre-payment in the amount indicated in the transaction details received 315 from the user device 110. The transaction processing server 170 may transmit a receipt of the pre-payment to merchant server 140 in addition to transmitting 325 the set of user identities, and the merchant server 140 may use the received pre-payment information to conduct 335 the transaction. An advantage of process 360 is that it may enable the user 105 to circumvent payment restrictions imposed by merchant server 140, such as may be the case if the merchant server 140 were unable to accept a particular payment method.

Figure 3D:
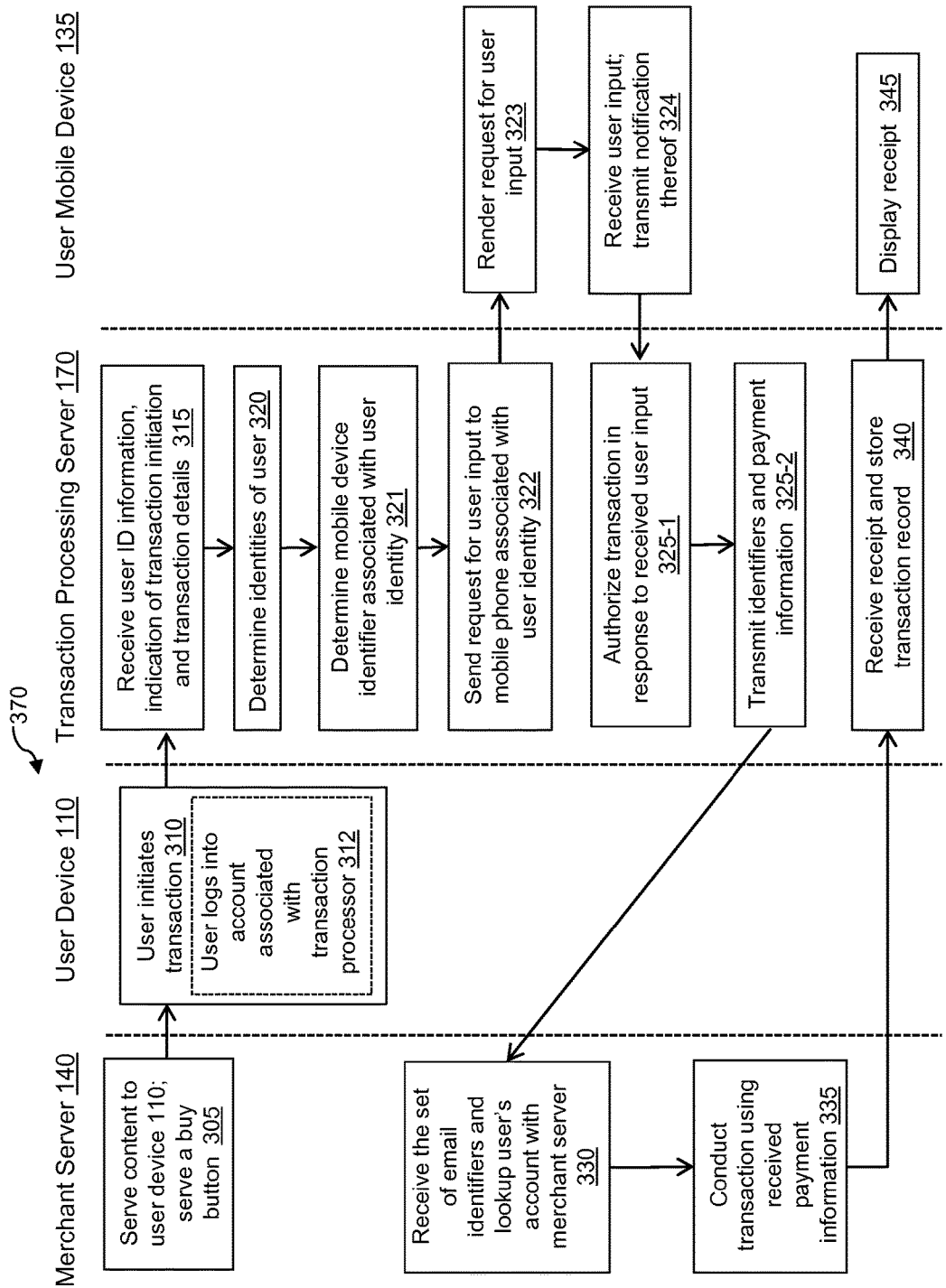
FIG. 3D is a flowchart illustrating an authorization process using a user's mobile device, according to one embodiment.

FIG. 3D illustrates a process 370 for a dual-step order confirmation using a user's mobile device 120, according to one embodiment. Process 370 is similar to process 360, except that for security purposes, user authorization is requested to complete the transaction. For example, it may be desirable to make certain that the user initiating the transaction is authorized to initiate the transaction before transferring money to the merchant server 140.

In order to authorize the transaction, the transaction processing server 170 determines 321 an identifier of a mobile device 120 associated with the user account of the user. The mobile device identifier may be previously stored in a user database 180, which may be populated, for example, during a user registration process completed when user 105 installed the client-side payment application 124 on a mobile device 120. In some embodiments, the identity match module 178 of the server-side payment application 175 receives a user's provisioned identities 113 from the identity aggregation module 135, retrieves a corresponding user record from the user information database 180, and retrieves the mobile device identifier 125 from the user record.

The transaction processing server 170 sends 322 a request for user input to the mobile device having an associated identifier 125 determined at step 321. In one embodiment, the request for user input into the mobile device is transmitted via an Unstructured Supplementary Service Data (USSD) session. Other types of methods for communication between transaction processing server 170 and mobile device 120 can also be used. In another embodiment, the request for user input into the mobile device 120 is transmitted to client-side payment application 124. In one embodiment, the payment application 124 is launched or awakened in response to receiving the request for user input from the transaction processing server 170.

The mobile device 120 displays 323 a user interface to request the user input from the user. A variety of different types of user input may be requested from the user. Example user interfaces displayed by the mobile device 120 to request user input are illustrated in FIGS. 4E-4H.

In one embodiment, the request for user input includes a request for completion of a physical act on the mobile device by the user. The completion of the physical act provides some assurance that the user is in possession and control of the mobile device associated with the user's identity framework. In one embodiment, the request for user input includes a request for selecting a soft button. The request for user input may alternatively include a request for completion of a touch screen gesture other than a selection of a soft button, such as a swipe or a flick. FIGS. 4E-4G illustrates examples of a request for user input at a soft button displayed on a mobile device 120. In the example illustrated in FIG. 4E, mobile device 120 has a touch screen and displays a message 420, which in one embodiment is a soft button inviting the user of the mobile device 120 to approve the transaction by providing an input at the message 420. In the example illustrated in FIG. 4E, no information is provided in the initial message 420 about the transaction, since it can be assumed that the user has initiated the transaction and therefore has knowledge of it. However, in another embodiment, at least some information can be provided in the message about the transaction, as illustrated in FIG. 4F, which shows a message 440 asking the user to confirm purchase of concert tickets. Details about the proposed transaction may alternatively be provided in a popup displayed on the mobile device 120 or the user device 110. In yet another example, as illustrated in FIG. 4G, the mobile device 120 displays both a soft button 420 enabling the user to approve the transaction and a soft button 422 enabling the user to decline the transaction.

In another embodiment, the request for user input includes a request for entry of a password (e.g., a password associated with client-side payment application 124). The request may alternatively include a request for entry of a bank ATM pin or other secret pin. FIG. 4H illustrates an example of an authorization process requesting user of mobile device 120 to provide a pin 470 to approve a transaction. In one embodiment, the user enters the pin 470 using a soft keyboard 480 displayed by the mobile device 120.

In some embodiments, the type of physical act requested depends on the type and capabilities of the mobile device 120. Thus, if the mobile device 120 has a touch screen capable of receiving touch input, a requested physical act may include a swipe. Such a physical act would not be requested of a mobile device 120 without a touch screen. Furthermore, in some embodiments, the type of physical act requested depends on the type of financial transaction, a transaction amount, and/or user preferences. For example, a user 105 may cause a preference to be stored, for example, in a user account maintained by the transaction processing server 170 that the user wishes dual-step authorization for purchases over a particular amount, or for transactions with a particular merchant system 140. For dual-input authorization, in some embodiments, after receiving an initial user input from user mobile device 120, the transaction processing server 170 sends a request for authorization to mobile device 120. In some embodiments, the first request for user input may include a request for a simple task to signify that the user is in possession of the mobile device 120, while the second request for user input may request sensitive user information. The sensitive user information can be matched against stored information for the user or otherwise used for authorization. For example, a first request of user input may require the user to depress a soft button (e.g., depress a "Approve Transaction" or similar button, as illustrated in FIGS. 4E and 4F), while the second request may require the user to enter a pin or password (as illustrated in FIG. 4H). In one embodiment, a hash of the pin or password is transmitted by the mobile device 120 to the transaction processing server 170 as indication of authorization.

The mobile device 120 receives 324 the user input from the user, and transmits a notification of the received user input or the pin or password entered by the user to the transaction processing server 170. In some embodiments, depending on the sensitivity of the nature of information being transmitted, it may be protected, for example, using encryption techniques. The client-side payment application 124 executing on the user mobile device 120 may process the user input prior to transmitting the input or the notification to the transaction processing server 170 hash and salt the user-entered password or pin, and transmit the hashed and salted password to transaction processing server 170, for instance via a USSD session.

The transaction processing server 170 uses the received authorization information to authorize 325-1 the transaction and to make a payment to the merchant server 140. The user authorization information may be compared to information stored, for example, in user account information 180, or may be sent to a third party (such as, a bank card or credit card issuing authority) for authorization.

In some embodiments, the user input is valid for a limited duration. Accordingly, if the user input is not received at the transaction processing server 170 within a predefined amount of time, transaction processing server 170 deems the transaction unsuccessful. The transaction processing server 170 cancels the unsuccessful transaction, and may send a cancellation message to merchant server 140 and/or may send a message, such as a fraud alert, to the user 105, for example via an SMS message sent to the mobile device 120. Similarly, if the user provides an input at the mobile device 120 to cancel the transaction (e.g., selecting the decline button 422 shown in FIG. 4G), the transaction processing server 170 cancels the transaction.

If the transaction is authorized 325-1, the transaction processing server 170 transmits 325-2 an identity of the user at the merchant server 140 and financial information of the user to the merchant server 140, which conducts 335 the transaction and sends 340 a receipt for the transaction to the transaction processing server 170. In one embodiment, the transaction processing server 170 sends a receipt to the mobile device 120, which displays 345 the receipt. An example transaction receipt 490 displayed by the mobile device 120 is shown in FIG. 4I. In the example of FIG. 4I, the transaction receipt 490 includes such information as an amount of the transaction and the time the transaction was completed.

Thus, process 370 enables authorization of a transaction initiated using a user device 110 and authorized using user mobile device 120. In one embodiment, no authorization or other input is requested from the user 105 at the user device 110 after the transaction is initiated at the user device 110. Rather, input is requested at the user's mobile device 120 to authorize the transaction.

In the system and methods illustrated in FIGS. 1 and 3, the client device 110 and mobile device 120 are illustrated as two separate devices. However, in another embodiment, the described functionality may be performed solely by the mobile device. In this case, the user 105 may use the browser application 122 on mobile device 120 to access content served by merchant server 140, and transaction processing server 170 may use the mobile device 120 for user authorization.

Figure 5:
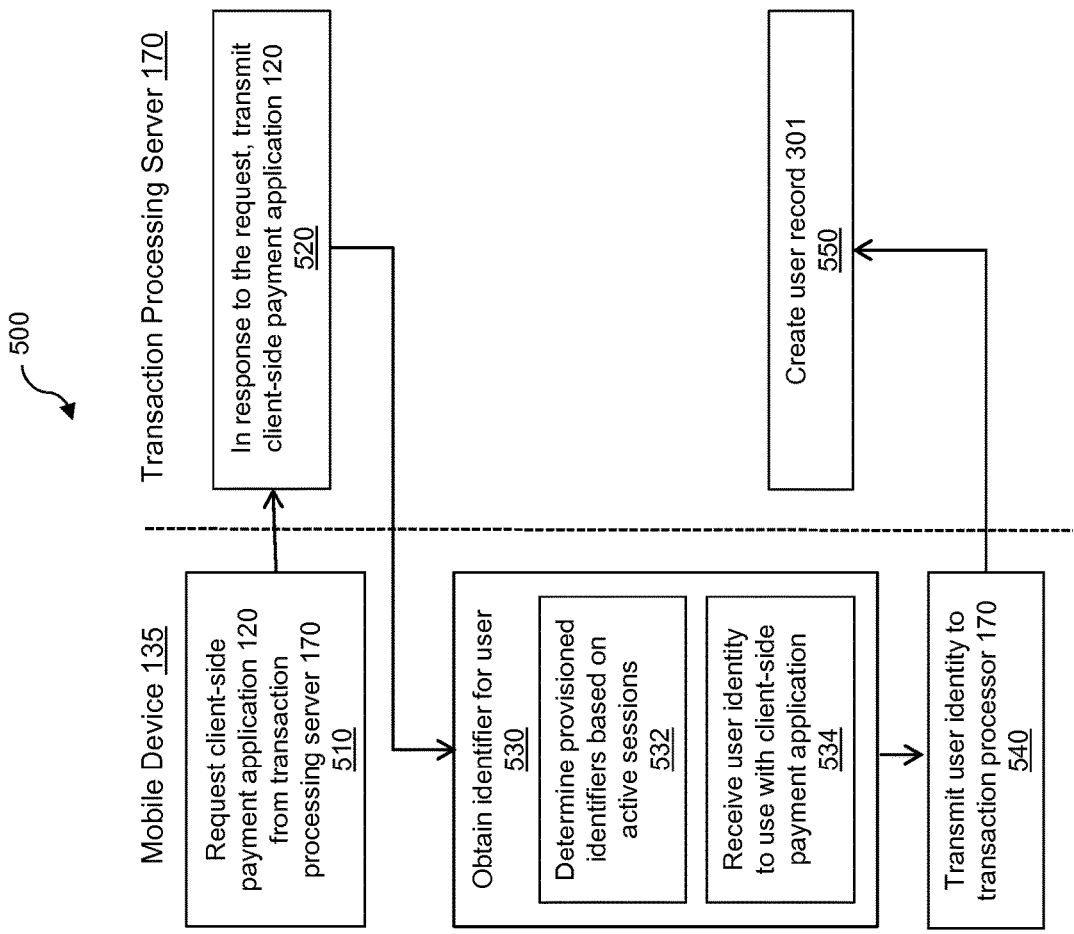
FIG. 5 is a flowchart illustrating a user registration process, according to one embodiment.

FIG. 5 illustrates a block diagram of a registration process 500 used to create a user identity record 201 in the user information database 180, according to one embodiment. In one embodiment, the process 500 comprises interactions between a mobile device 120 and the transaction processing server 170. Other embodiments of the process 500 may include fewer, different, or additional steps, and the steps may be performed in different orders.

In one embodiment, process 500 begins with the mobile device 120 requesting 510 (e.g., in response to a user input) the client-side payment application 124 from the transaction processing server 170 for execution on the mobile device 120. In response to the request, the transaction processing server 170 pushes or otherwise provides 520 the client-side payment application 124 to the mobile device 120 using, for example, a mobile communications network. Once executing on mobile device 120, client-side payment application 124 obtains 530 an identifier associated with the user 105. In one embodiment, client-side payment application 124 does not require user 105 to create or otherwise log in to client-side payment application 124. Instead, the client-side payment application 124 determines 532 provisioned identifiers for the user 105 based on the user's active sessions, for example with social networking accounts, email accounts, or other online accounts active on the mobile device 120. In another embodiment, where the user 105 does not participate in such sessions, for example, with social networking accounts, email accounts, or other online systems, the user 105 may create a user name and password with which to log into client-side payment application 124. The payment application 124 receives 534 the user name and passwords, and uses the user name and password as the identifier associated with the user 105. The client-side payment application 124 transmits 540 the one or more identifiers for the user 105 to the transaction processing server 170, which creates 550 a record 201 for user 105 associating the mobile device identifier for mobile device 120 and the one or more user identifiers together. The transaction processing server 170 may subsequently modify or update user record 201 based, for example, on transactions completed by the user 105 or changes in the user identifier 211 data. The user 105 may optionally provide user preference data (e.g., preferred shipping address, preferred payment method information, etc.) during (or subsequent to) the registration process.

Figure 6:
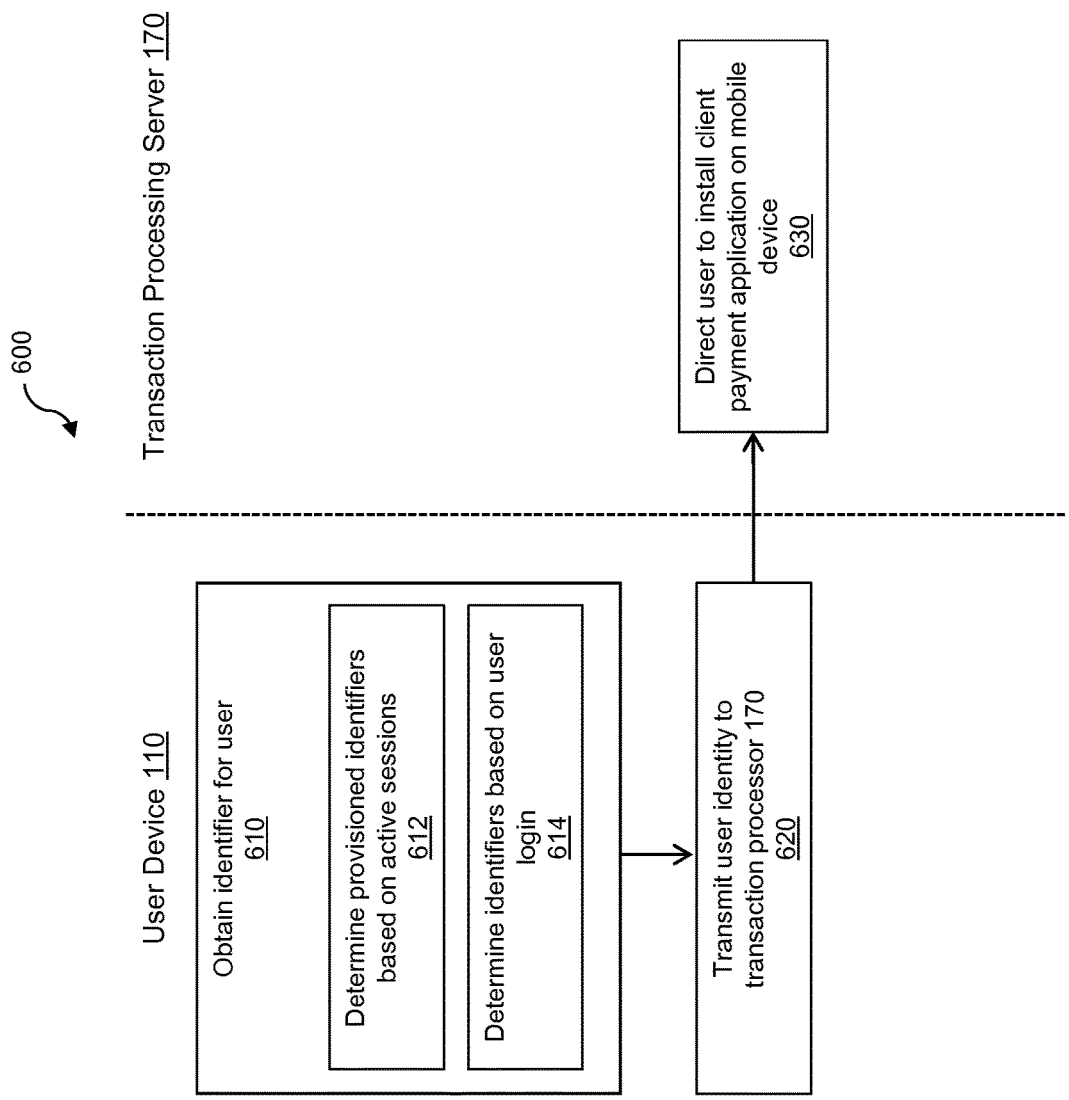
FIG. 6 is a flowchart illustrating a user registration process

FIG. 6 illustrates a block diagram of a process 600 that may precede process 500 discussed with reference to FIG. 5. In particular, process 600 may lead to the user 105 requesting client-side payment application 124 from transaction processing server 170 for execution on mobile device 120. In one embodiment, the process 600 comprises interactions between a user device 110 and the transaction processing server 170. Other embodiments of the process 600 may include fewer, different, or additional steps, and the steps may be performed in different orders.

The user device 110 obtains 610 an identifier of the user of the user device 110. In one embodiment, the user device 110 obtains 610 the identifier in response to the user selecting the buy button 415 displayed on the user device 110 to purchase an object for sale. In another embodiment, the user device 110 obtains 610 the identifier in response to the buy button 415 being displayed by the user device 110, prior to the user selecting the buy button 415. In an embodiment in which the buy button 415 is embedded or otherwise integrated into advertisement content (e.g., content 416), pre-emptive identification of the user can be used to personalize the advertisement content, for example by displaying a greeting to the user 105.

In one embodiment, the user is not required to create or otherwise log into an account associated with the provider of the object for sale. Instead, the user device 110 or an external identity provider determines 612 provisioned identifiers for the user 105 based on the user's active sessions, for example with social networking accounts, email accounts, or accounts with other online systems that are active on user device 110. In another embodiment, the user 105 may provide a user name and password with which to log into an account with server-side payment application 175. In this case, the user device 110 determines 614 the identifiers from the user account.

The user device 110 transmits 620 the user identifier to the transaction processing server 170, which performs a lookup to see if there is a user record 201 in the user information database 180. If no record exits, user 105 is requested to register with server-side payment application 175 and install client-side payment application 124 on the mobile device 120.

Computing Machine Architecture

Figure 7:
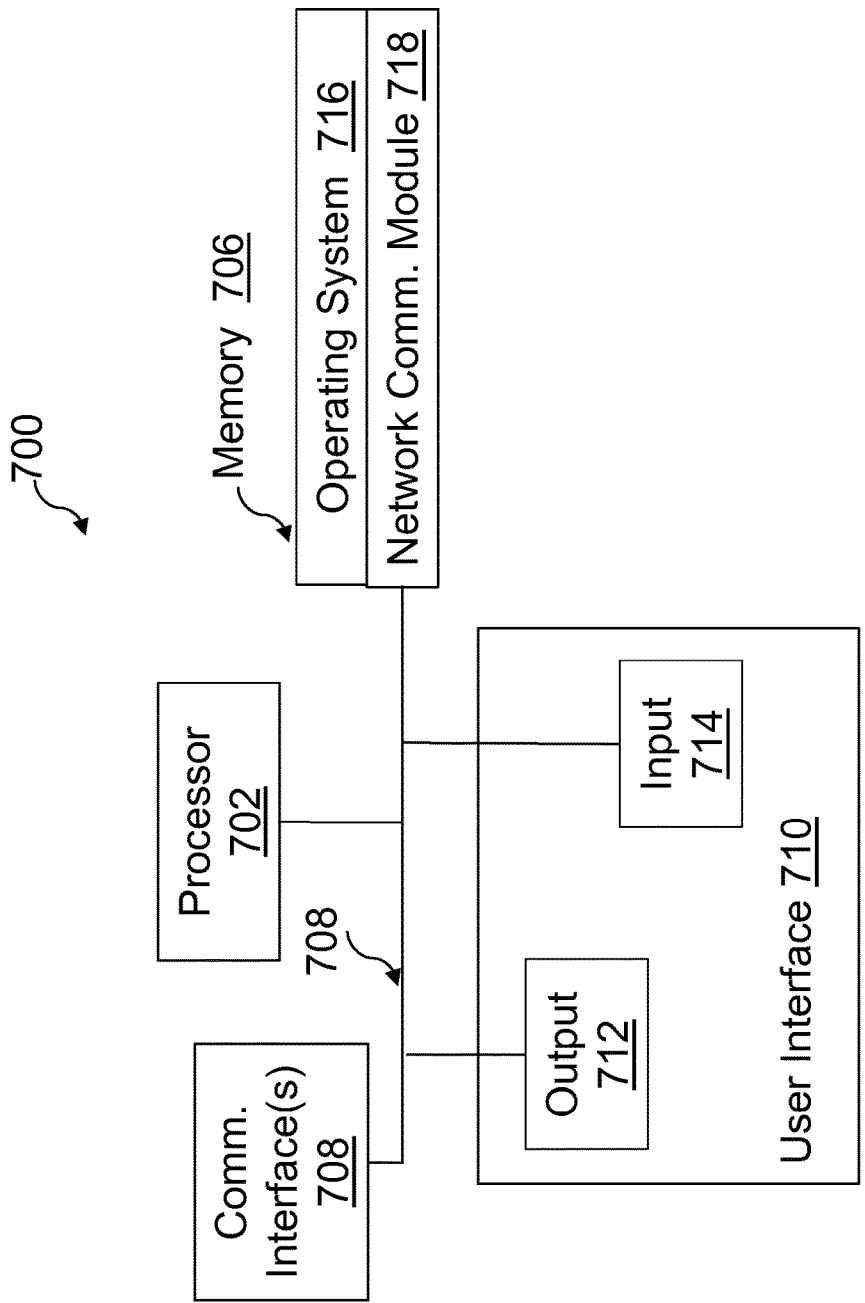
FIG. 7 is a block diagram of an example machine able to read instructions from a machine-readable medium and execute them in a processor (or controller).

FIG. 7 is a block diagram of one embodiment of a computing device 700, which can be used as any one of user device 110, merchant server 140 and transaction processing server 170. In one embodiment computing device 700 includes one or more processing units (CPUs) 702, one or more network or other communications interfaces 708, memory 706, and one or more communication buses 708 for interconnecting these components. The communication buses 708 may include circuitry (sometimes called a chipset) that interconnects and controls communications between system components. Computing device 700 may include a user interface 710 comprising an output (e.g. display) device 712 and an input device (e.g., keyboard) 714.

Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. Memory 706, or one or more of the storage devices (e.g., one or more non-volatile storage devices) in memory 706, includes a computer readable storage medium. In some embodiments, memory 706 or the computer readable storage medium of memory 706 stores the following programs, modules and data structures, or a subset thereof: an operating system 716 that includes procedures for handling various basic system services and for performing hardware dependent tasks; a network communication module 718 that is used for connecting computing device 700 to other computers via the one or more communication network interfaces 708 and one or more communication networks, such as the Internet, other wide area networks, local area networks, or metropolitan area networks. In the case of the user device 110, memory 706 may further store other applications, such as browser application 115 and word processing applications. In the case of the merchant server 140, memory 706 may further store a marketplace application 142 and "buy button" interface module 156. In the case of the transaction processing server 170, memory 706 may further store server-side payment application 175, an identity match module 178, database of user accounts 180 (which may alternatively be stored externally), and transaction processing application 172.

Figure 8:
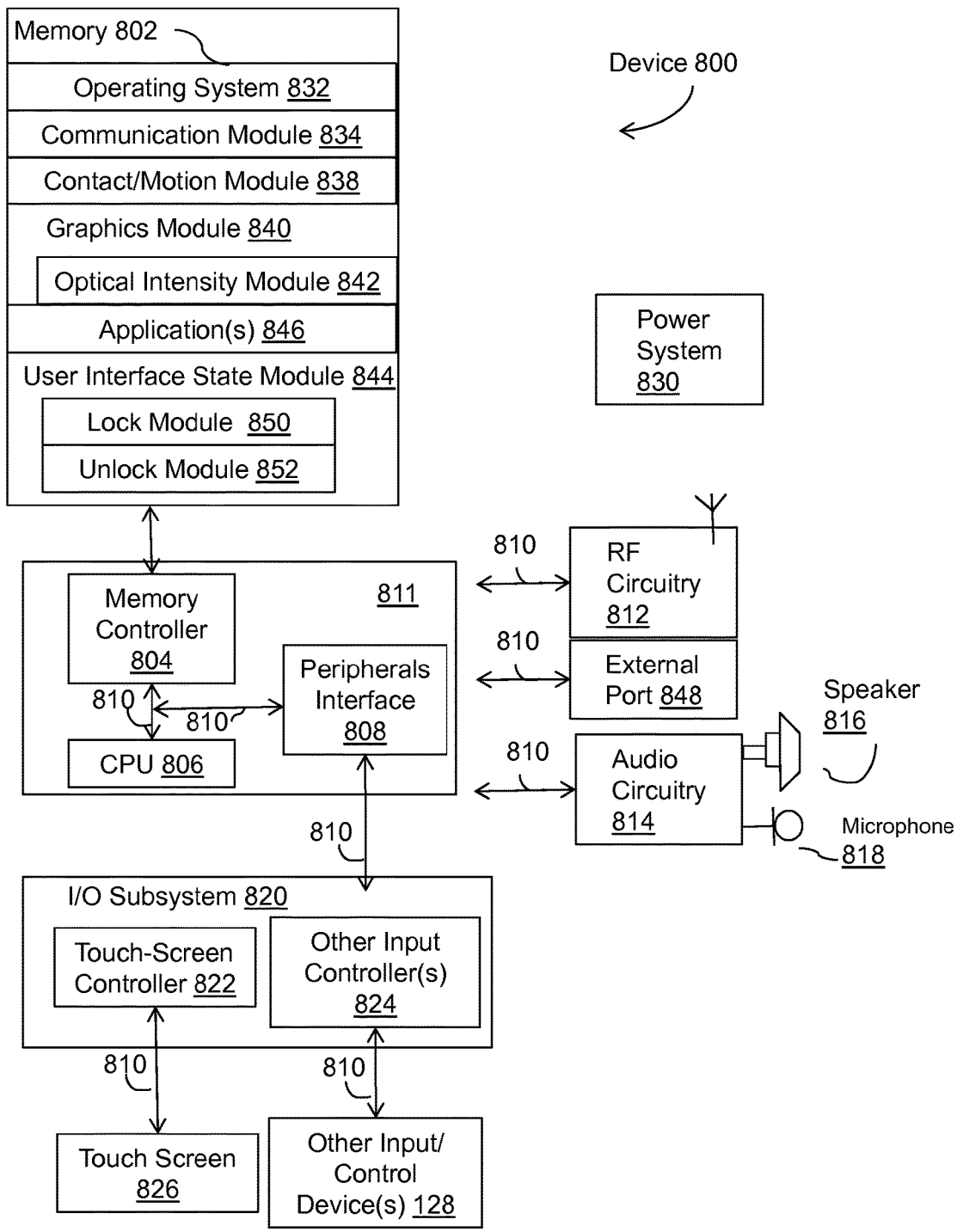
FIG. 8 is a block diagram illustrating an example mobile device.

FIG. 8 illustrates one embodiment of a portable electronic device 800, which can function as user mobile device 120. The device 800 includes a memory 802, a memory controller 104, one or more processing units (CPU's) 806, a peripherals interface 808, RF circuitry 812, audio circuitry 814, a speaker 816, a microphone 818, an input/output (I/O) subsystem 820, a touch screen 826, other input or control devices 828, and an external port 848. These components communicate over the one or more communication buses or signal lines 810. It should be appreciated that the device 800 is only one example of a portable electronic device 800, and that the device 800 may have more or fewer components than shown, or a different configuration of components. The various components shown in FIG. 8 may be implemented in hardware, software or a combination of both hardware and software, including one or more signal processing and/or application specific integrated circuits.

The memory 802 may include high speed random access memory and may also include non-volatile memory, such as one or more magnetic disk storage devices, flash memory devices, or other non-volatile solid state memory devices. In some embodiments, the memory 802 may further include storage remotely located from the one or more processors 806, for instance network attached storage accessed via the RF circuitry 812 or external port 848 and a communications network (not shown) such as the Internet, intranet(s), Local Area Networks (LANs), Wide Local Area Networks (WLANs), Storage Area Networks (SANs) and the like, or any suitable combination thereof. Access to the memory 802 by other components of the device 800, such as the CPU 806 and the peripherals interface 808, may be controlled by the memory controller 804.

The peripherals interface 808 couples the input and output peripherals of the device to the CPU 806 and the memory 802. The one or more processors 806 run various software programs and/or sets of instructions stored in the memory 802 to perform various functions for the device 800 and to process data.

In some embodiments, the peripherals interface 808, the CPU 806, and the memory controller 804 may be implemented on a single chip, such as a chip 811. In some other embodiments, they may be implemented on separate chips.

The RF (radio frequency) circuitry 812 receives and sends electromagnetic waves. The RF circuitry 812 converts electrical signals to/from electromagnetic waves and communicates with communications networks and other communications devices via the electromagnetic waves. The RF circuitry 812 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 812 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 814, the speaker 816, and the microphone 818 provide an audio interface between a user and the device 800. The audio circuitry 814 receives audio data from the peripherals interface 808, converts the audio data to an electrical signal, and transmits the electrical signal to the speaker 816. The speaker converts the electrical signal to human-audible sound waves. The audio circuitry 814 also receives electrical signals converted by the microphone 816 from sound waves. The audio circuitry 814 converts the electrical signal to audio data and transmits the audio data to the peripherals interface 808 for processing. Audio data may be may be retrieved from and/or transmitted to the memory 802 and/or the RF circuitry 812 by the peripherals interface 808. In some embodiments, the audio circuitry 814 also includes a headset jack (not shown). The headset jack provides an interface between the audio circuitry 814 and removable audio input/output peripherals, such as output-only headphones or a headset with both output (headphone for one or both ears) and input (microphone).

The I/O subsystem 820 provides the interface between input/output peripherals on the device 800, such as the touch screen 826 and other input/control devices 828, and the peripherals interface 808. The I/O subsystem 820 includes a touch-screen controller 822 and one or more input controllers 824 for other input or control devices. The one or more input controllers 824 receive/send electrical signals from/to other input or control devices 828. The other input/control devices 828 may include physical buttons (e.g., push buttons, rocker buttons, etc.), dials, slider switches, sticks, and so forth.

The touch screen 826 provides both an output interface and an input interface between the device and a user. The touch-screen controller 822 receives/sends electrical signals from/to the touch screen 826. The touch screen 826 displays visual output to the user. The visual output may include text, graphics, video, and any combination thereof. Some or all of the visual output may correspond to user-interface objects, further details of which are described below.

The touch screen 826 also accepts input from the user based on haptic and/or tactile contact. The touch screen 826 forms a touch-sensitive surface that accepts user input. The touch screen 826 and the touch screen controller 822 (along with any associated modules and/or sets of instructions in the memory 802) detects contact (and any movement or break of the contact) on the touch screen 826 and converts the detected contact into interaction with user-interface objects, such as one or more soft keys, that are displayed on the touch screen. In an exemplary embodiment, a point of contact between the touch screen 826 and the user corresponds to one or more digits of the user. The touch screen 826 may use LCD (liquid crystal display) technology, or LPD (light emitting polymer display) technology, although other display technologies may be used in other embodiments. The touch screen 826 and touch screen controller 822 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 826. However, the touch screen 826 displays visual output from the portable device, whereas touch sensitive tablets do not provide visual output. The touch screen 826 may have a resolution in excess of 800 dpi. In an exemplary embodiment, the touch screen 826 may have a resolution of approximately 868 dpi. The user may make contact with the touch screen 826 using any suitable object or appendage, such as a stylus, finger, and so forth.

In some embodiments, in addition to the touch screen, the device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 826 or an extension of the touch-sensitive surface formed by the touch screen 826.

The device 800 also includes a power system 830 for powering the various components. The power system 830 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 832, a communication module (or set of instructions) 834, a contact/motion module (or set of instructions) 838, a graphics module (or set of instructions) 840, a user interface state module (or set of instructions) 844, and one or more applications (or set of instructions) 846.

The operating system 832 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 834 facilitates communication with other devices over one or more external ports 848 and also includes various software components for handling data received by the RF circuitry 812 and/or the external port 848. The external port 848 (e.g., Universal Serial Bus (USB), FIREWIRE, etc.) is adapted for coupling directly to other devices or indirectly over a network (e.g., the Internet, wireless LAN, etc.).

The contact/motion module 838 detects contact with the touch screen 826, in conjunction with the touch-screen controller 822. The contact/motion module 838 includes various software components for performing various operations related to detection of contact with the touch screen 822, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 826 and the touch screen controller 822 also detects contact on the touchpad.

The graphics module 840 includes various known software components for rendering and displaying graphics on the touch screen 826. Note that the term "graphics" includes any object that can be displayed to a user, including without limitation text, web pages, icons (such as user-interface objects including soft keys), digital images, videos, animations and the like.

In some embodiments, the graphics module 840 includes an optical intensity module 842. The optical intensity module 842 controls the optical intensity of graphical objects, such as user-interface objects, displayed on the touch screen 826. Controlling the optical intensity may include increasing or decreasing the optical intensity of a graphical object. In some embodiments, the increase or decrease may follow predefined functions.

The user interface state module 844 controls the user interface state of the device 800. The user interface state module 844 may include a lock module 850 and an unlock module 852. The lock module detects satisfaction of any of one or more conditions to transition the device 800 to a user-interface lock state and to transition the device 800 to the lock state. The unlock module detects satisfaction of any of one or more conditions to transition the device to a user-interface unlock state and to transition the device 800 to the unlock state.

The one or more applications 830 can include any applications installed on the device 800, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc. Client-side payment application 124 may also be installed on device 800.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for conducting a transaction through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for enabling a financial transaction, the method comprising:
receiving at a transaction processing server, a request from a user computing device to conduct the financial transaction with a merchant server;
determining a plurality of user identifiers for user accounts associated with the user computing device at a respective plurality of online systems, wherein:

a first user identifier of the plurality of user identifiers identifying identifies a first user account at the transaction processing server,
a second user identifier of the plurality of user identifiers identifies a second user account at the merchant server, and
the plurality of user identifiers is determined based on sessions with the online systems active on the user computing device, wherein the online systems are distinct from the transaction processing server and the merchant server;
retrieving using the plurality of user identifiers, financial information associated with the first user account at the transaction processing server;
determining a mobile device identifier associated with the first user account at the transaction processing server;
sending a request to a mobile device associated with the mobile device identifier to provide user input, the request for user input including a request for completion of a physical act on the mobile device by the user, wherein the mobile device is distinct from the user computing device;
receiving an indication that the requested user input was provided at the mobile device; and
responsive to receiving the indication, transmitting the second identifier and the financial information to the merchant server, the merchant server adapted to conduct the transaction with the user computing device using the financial information.

2. The method of claim 1, wherein the request from the user computing device includes the first identifier, the method further comprising:
storing in the first user account at the transaction processing server, the plurality of user identifiers and the financial information;
wherein determining the plurality of user identifiers comprises retrieving previously saved user identifiers using the first identifier.

3. The method of claim 1, wherein determining the plurality of user identifiers comprises receiving the user identifiers from a user identity aggregator.

4. The method of claim 1, further comprising:
processing a payment to the merchant server using the financial information, wherein the payment is used by the merchant server to conduct the financial transaction.

5. The method of claim 1, wherein the request for user input includes a request for depressing a soft key displayed on the mobile device.

6. The method of claim 1, wherein the request for user input includes a request for completion of a touch screen gesture on the mobile device.

7. The method of claim 1, wherein the request for user input includes a request for entry of a password at the mobile device.

8. The method of claim 1, wherein the request for user input includes a request for entry of a secret pin at the mobile device.

9. A non-transitory computer-readable storage medium storing executable computer program instructions to conduct a financial transaction, the computer program instructions when executed by a processor causing the processor to:
receive at a transaction processing server, a request from a user computing device to conduct the financial transaction with a merchant server;
determine a plurality of user identifiers for user accounts associated with the user computing device at a respective plurality of online systems, wherein:
a first user identifier of the plurality of user identifiers identifies a first user account at the transaction processing server,
a second user identifier of the plurality of user identifiers identifies a second user account at the merchant server, and
the plurality of user identifiers is determined based on sessions with the online systems active on the user computing device, wherein the online systems are distinct from the transaction processing server and the merchant server;
retrieve using the plurality of user identifiers, financial information associated with the first user account at the transaction processing server;
determine a mobile device identifier associated with the first user account at the transaction processing server;
send a request to a mobile device associated with the mobile device identifier to provide user input, the request for user input including a request for completion of a physical act on the mobile device by the user, wherein the mobile device is distinct from the user computing device;
receive an indication that the requested user input was provided at the mobile device; and
responsive to receiving the indication, transmit the second identifier and the financial information to the merchant server, the merchant server adapted to conduct the transaction with the user computing device using the financial information.

10. The non-transitory computer-readable storage medium of claim 9, wherein the request from the user computing device includes the first identifier, the computer program instructions further comprising instructions that when executed by the processor cause the processor to:
store in the first user account at the transaction processing server, the plurality of user identifiers and the financial information;
wherein the computer program instructions causing the processor to determine the plurality of user identifiers comprise computer program instructions that when executed by the processor cause the processor to retrieve previously saved user identifiers using the first identifier.

11. The non-transitory computer-readable storage medium of claim 9, wherein the computer program instructions causing the processor to determine the plurality of user identifiers comprise computer program instructions that when executed by the processor cause the processor to receive the user identifiers from a user identity aggregator.

12. The non-transitory computer-readable storage medium of claim 9, further comprising computer program instructions that when executed by the processor cause the processor to:
process a payment to the merchant server using the financial information, wherein the payment is used by the merchant server to conduct the financial transaction.

13. The non-transitory computer-readable storage medium of claim 10, wherein the request for user input includes a request for depressing a soft key displayed on the mobile device.

14. The non-transitory computer-readable storage medium of claim 10, wherein the request for user input includes a request for completion of a touch screen gesture on the mobile device.

15. The non-transitory computer-readable storage medium of claim 10, wherein the request for user input includes a request for entry of a password at the mobile device.

16. The non-transitory computer-readable storage medium of claim 10, wherein the request for user input includes a request for entry of a secret pin at the mobile device.

\* \* \* \* \*